(12) United States Patent
Godaliyadda et al.

(10) Patent No.: US 12,430,731 B2
(45) Date of Patent: Sep. 30, 2025

(54) GENERATION OF THREE-DIMENSIONAL (3D) LOOKUP TABLE FOR TONE MAPPING OR OTHER IMAGE PROCESSING FUNCTIONS

(71) Applicant: Samsung Electronics Co., Ltd., Suwon-si (KR)

(72) Inventors: Gunawath Dilshan Godaliyadda, Allen, TX (US); John W. Glotzbach, Allen, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 18/046,117

(22) Filed: Oct. 12, 2022

(65) Prior Publication Data
US 2023/0252611 A1 Aug. 10, 2023

Related U.S. Application Data

(60) Provisional application No. 63/308,352, filed on Feb. 9, 2022.

(51) Int. Cl.
*G06T 5/92* (2024.01)
*G06T 5/20* (2006.01)
*G06T 5/70* (2024.01)

(52) U.S. Cl.
CPC ............... *G06T 5/92* (2024.01); *G06T 5/20* (2013.01); *G06T 5/70* (2024.01); *G06T 2207/20208* (2013.01)

(58) Field of Classification Search
CPC .... G06T 5/92; G06T 5/20; G06T 5/70; G06T 2207/20208; G06T 5/94; G06T 2207/10024; G06T 2207/20021
See application file for complete search history.

(56) References Cited

U.S. PATENT DOCUMENTS

| 7,164,397 | B2 | 1/2007 | Pettitt et al. |
| 8,447,132 | B1 * | 5/2013 | Galil ............... G06V 40/161 |
| | | | 358/1.9 |

(Continued)

FOREIGN PATENT DOCUMENTS

| EP | 3984210 B1 | 8/2023 |
| JP | 2007180851 A * | 7/2007 |

(Continued)

OTHER PUBLICATIONS

Adobe Inc., "Digital Negative (DNG) Specification," Version 1.6. 0.0, Dec. 2021, 109 pages.

(Continued)

*Primary Examiner* — Oneal R Mistry
*Assistant Examiner* — Justin Philip Cascais

(57) ABSTRACT

A method includes obtaining an image and a gain map associated with the image. The method also includes identifying image patches in the image and corresponding gain map patches in the gain map. Different image patches are centered around different anchor points in the image. The method further includes, for each image patch and its corresponding gain map patch, generating an intensity-gain curve for the associated anchor point. The intensity-gain curve specifies (i) gain values based on the corresponding gain map patch for intensity values up to a threshold intensity value and (ii) gain values based on one or more input parameters for intensity values above the threshold intensity value. In addition, the method includes combining the intensity-gain curves to generate a 3D lookup table, which identifies the gain values for the anchor points in the image at each of multiple intensity values.

21 Claims, 7 Drawing Sheets

(56) References Cited

U.S. PATENT DOCUMENTS

| | | |
|---|---|---|
| 9,959,604 B2 | 5/2018 | Chen et al. |
| 10,229,484 B2 | 3/2019 | Roffet et al. |
| 10,708,564 B2 | 7/2020 | Park et al. |
| 11,195,247 B1 | 12/2021 | Blasinski et al. |
| 11,800,235 B2 | 10/2023 | Geiss et al. |
| 2014/0152694 A1* | 6/2014 | Narasimha ........... H04N 23/741 345/629 |
| 2017/0223267 A1 | 8/2017 | Dabral et al. |
| 2017/0358063 A1* | 12/2017 | Chen .................... H04N 1/6005 |
| 2021/0012755 A1 | 1/2021 | Narasimha et al. |
| 2023/0128220 A1 | 4/2023 | Ogiwara |

FOREIGN PATENT DOCUMENTS

| | | | |
|---|---|---|---|
| JP | 2021132244 A * | 9/2021 | |
| KR | 10-2020-0093694 A | 8/2020 | |
| KR | 10-2021-0091704 A | 7/2021 | |

OTHER PUBLICATIONS

International Search Report and Written Opinion of the International Searching Authority dated May 15, 2023 in connection with International Patent Application No. PCT/KR2023/001803, 10 pages.

\* cited by examiner

GENERATION OF THREE-DIMENSIONAL (3D) LOOKUP TABLE FOR TONE MAPPING OR OTHER IMAGE PROCESSING FUNCTIONS

CROSS-REFERENCE TO RELATED APPLICATION AND PRIORITY CLAIM

This application claims priority under 35 U.S.C. § 119(e) to U.S. Provisional Patent Application No. 63/308,352 filed on Feb. 9, 2022. This provisional application is hereby incorporated by reference in its entirety.

TECHNICAL FIELD

This disclosure relates generally to image processing systems. More specifically, this disclosure relates to generation of a three-dimensional (3D) lookup table for tone mapping or other image processing functions.

BACKGROUND

"Raw" image data refers to image data that has undergone little if any processing after being captured by one or more imaging sensors. Raw image data may often be generated and stored in specific raw file types, such as in Digital Negative (DNG) files. Raw image data can be useful in a number of circumstances since raw image data can be subsequently processed to achieve the creation of desired effects in output images. In many cases, for example, raw image data can have a wider dynamic range or a wider color gamut that is narrowed during subsequent image processing operations in order to produce still or video images suitable for display or other use.

SUMMARY

This disclosure relates to generation of a three-dimensional (3D) lookup table for tone mapping or other image processing functions.

In a first embodiment, a method includes obtaining an image and a gain map associated with the image. The method also includes identifying image patches in the image and corresponding gain map patches in the gain map. Different image patches are centered around different anchor points in the image. The method further includes, for each image patch and its corresponding gain map patch, generating an intensity-gain curve for the associated anchor point. The intensity-gain curve specifies (i) gain values based on the corresponding gain map patch for intensity values up to a threshold intensity value and (ii) gain values based on one or more input parameters for intensity values above the threshold intensity value. In addition, the method includes combining the intensity-gain curves to generate a 3D lookup table. The 3D lookup table identifies the gain values for the anchor points in the image at each of multiple intensity values.

In a second embodiment, an apparatus includes at least one processing device configured to obtain an image and a gain map associated with the image. The at least one processing device is also configured to identify image patches in the image and corresponding gain map patches in the gain map. Different image patches are centered around different anchor points in the image. The at least one processing device is further configured, for each image patch and its corresponding gain map patch, to generate an intensity-gain curve for the associated anchor point. The intensity-gain curve specifies (i) gain values based on the corresponding gain map patch for intensity values up to a threshold intensity value and (ii) gain values based on one or more input parameters for intensity values above the threshold intensity value. In addition, the at least one processing device is configured to combine the intensity-gain curves to generate a 3D lookup table. The 3D lookup table identifies the gain values for the anchor points in the image at each of multiple intensity values.

In a third embodiment, a non-transitory computer readable medium contains instructions that when executed cause at least one processor to obtain an image and a gain map associated with the image. The non-transitory computer readable medium also contains instructions that when executed cause the at least one processor to identify image patches in the image and corresponding gain map patches in the gain map. Different image patches are centered around different anchor points in the image. The non-transitory computer readable medium further contains instructions that when executed cause the at least one processor, for each image patch and its corresponding gain map patch, to generate an intensity-gain curve for the associated anchor point. The intensity-gain curve specifies (i) gain values based on the corresponding gain map patch for intensity values up to a threshold intensity value and (ii) gain values based on one or more input parameters for intensity values above the threshold intensity value. In addition, the non-transitory computer readable medium contains instructions that when executed cause the at least one processor to combine the intensity-gain curves to generate a 3D lookup table. The 3D lookup table identifies the gain values for the anchor points in the image at each of multiple intensity values.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
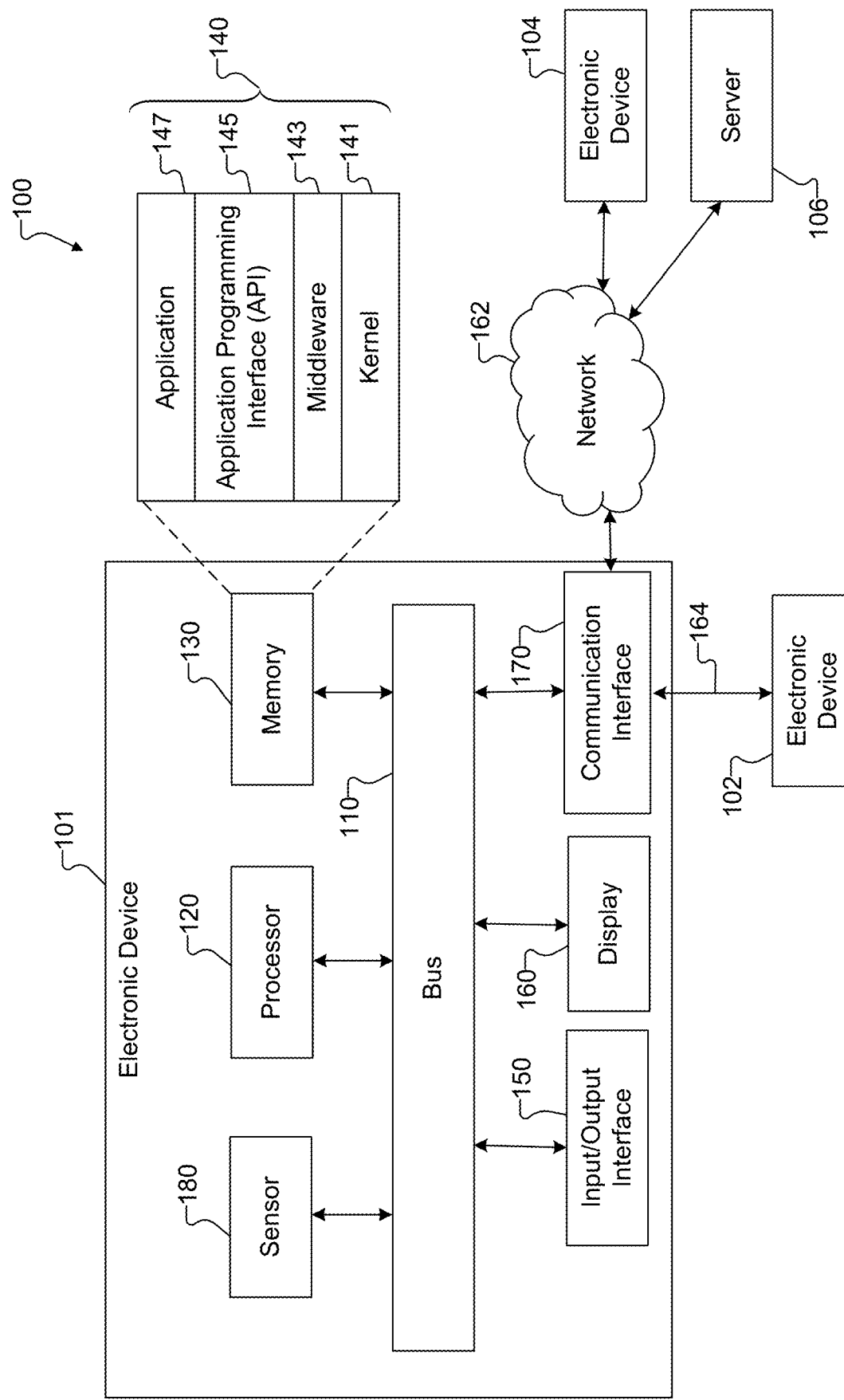
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, "raw" image data refers to image data that has undergone little if any processing after being captured by one or more imaging sensors. Raw image data may often be generated and stored in specific raw file types, such as in Digital Negative (DNG) files. Raw image data can be useful in a number of circumstances since raw image data can be subsequently processed to achieve the creation of desired effects in output images. In many cases, for example, raw image data can have a wider dynamic range or a wider color gamut that is narrowed during subsequent image processing operations in order to produce still or video images suitable for display or other use.

In some cases, it is possible to embed one or more "tags" within a DNG file or other raw image file. Each tag can be used to provide automatic adjustment of one or more aspects of raw image data, such as its color, tone, sharpness, or noise. As a particular example of this, it is possible to embed a profile gain table map (PGTM) into a DNG file, and the profile gain table map can be used to automatically adjust the tone of an image when the DNG file is loaded into a viewer. Tone mapping can be very useful or important in various applications, such as when generating high dynamic range (HDR) images. For instance, generating an HDR image often involves capturing multiple images of a scene using different exposures and combining the captured images to produce the HDR image. This type of processing can often result in the creation of unnatural tone within the HDR image.

Mobile electronic devices (such as smartphones and tablet computers) are becoming ubiquitous in today's society, and more and more photographs and videos are captured using mobile electronic devices. Unfortunately, attempting to generate profile gain table maps or other tone-mapping information for captured images on these or other devices can be problematic. For example, raw image data often has a higher number of bits per data value than images that are displayed, such as when raw image data includes 16-bit values and displayed image data includes 8-bit values. Tone mapping can be used to convert 16-bit or other raw image data values into 8-bit or other displayed image data values. However, it is routine for the resulting images to have portions that are too dark (under-exposed) and portions that are too bright (over-exposed) after tone mapping has occurred. Also, it is possible for the tone-mapping information to create halos and other artifacts when the tone-mapping information is applied to the raw image data. These types of issues tend to affect different images in different ways since the generation of tone-mapping information is typically image-dependent, meaning the tone-mapping information varies depending on the raw image data being processed.

This disclosure provides techniques for generating three-dimensional (3D) lookup tables for tone mapping or other image processing functions. As described in more detail below, an image and a gain map associated with the image can be obtained. In some cases, the image may be captured by at least one imaging sensor or may represent an image obtained by an electronic device. Overlapping or non-overlapping image patches can be identified in the image, and corresponding overlapping or non-overlapping gain map patches can be identified in the gain map. Each image patch in the image has a corresponding gain map patch in the gain map. Different image patches are centered around different anchor points in the image, such as different anchor points forming a grid pattern. For each image patch and its corresponding gain map patch, an intensity-gain curve is generated for the associated anchor point. For intensity values up to a threshold intensity value, the intensity-gain curve can identify gain values based on the corresponding gain map patch. For intensity values above the threshold intensity value, the intensity-gain curve can identify gain values based on one or more input parameters, such as knee points that are used to define a parameterized tail and smooth decay of the intensity-gain curve. The intensity-gain curves can be filtered if desired, such as in the intensity domain, the spatial domain, or both. The filtered intensity-gain curves can be combined to generate a 3D lookup table for the image, where the 3D lookup table identifies the gain values for the anchor points in the image at each of multiple intensity values.

The 3D lookup table may be used in various ways depending on the application. For example, in some embodiments, the 3D lookup table can be stored within or otherwise in association with raw image data representing the image, such as a DNG file. The 3D lookup table may be used to automatically adjust a tone-mapping of the raw image data when the raw image data is loaded into a viewer or otherwise used. In some cases, this tone-mapping can be performed for any arbitrary coordinates of the raw image data by identifying four coordinates in the 3D lookup table, where the four coordinates are associated with four anchor points around the arbitrary coordinates. Gain values contained in the 3D lookup table at the four coordinates can be interpolated in order to generate an interpolated gain value, and the interpolated gain value can be applied to at least one pixel of the raw image data at the arbitrary coordinates. This may be performed for multiple color channels of the raw image data, and this process may be repeated for some or all pixels of the raw image data in order to produce a tone-mapped image.

In this way, the 3D lookup table may be used to support tone mapping or other image processing functions. For instance, the 3D lookup table may be used to convert 16-bit or other raw image data values into 8-bit or other image data values for display or other use. The 3D lookup table may be used to perform this conversion while reducing or minimizing the creation of under-exposed and over-exposed regions within the resulting images. Also, the 3D lookup table may be used to help reduce or minimize the creation of halos and other artifacts when the tone mapping or other image processing functions are performed. Moreover, a 3D lookup table may be generated for each raw image being created or processed, so each 3D lookup table can be easily tailored to the specific image data in a raw image. In addition, the 3D lookup table can be generated so as to be consistent with a desired specification, such as when the 3D lookup table is generated as a profile gain table map suitable for embedded in or other use with a DNG file. This may improve the ease of use of the images with standard applications, such as ADOBE LIGHTROOM, or customized applications. Note that the generation of 3D lookup tables may be performed in any suitable electronic devices, such as smartphones, tablet computers, or any other electronic devices described above.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described below, the processor 120 may be used to create or process raw image data and generate 3D lookup tables for the raw image data. The processor 120 may also be used to apply the 3D lookup tables during tone mapping or other image processing operation(s) involving the raw image data.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for generating 3D lookup tables using raw image data and optionally applying the 3D lookup tables during tone mapping or other image processing operation(s) involving the raw image data. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106).

For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to create or process raw image data and generate 3D lookup tables for the raw image data. The server 106 may also be used to apply the 3D lookup tables during tone mapping or other image processing operation(s) involving the raw image data.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
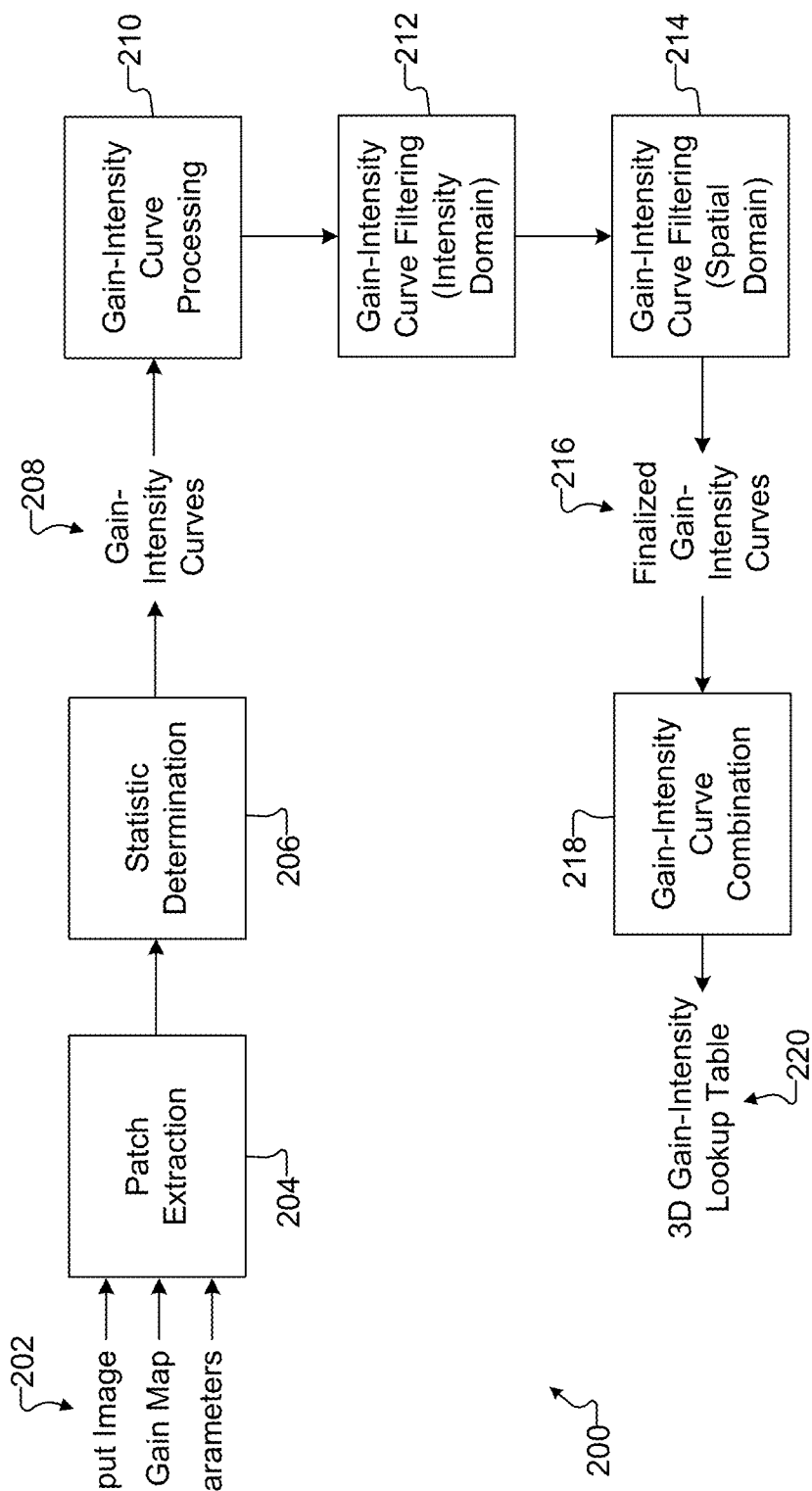
FIG. 2 illustrates an example architecture for generating a three-dimensional (3D) lookup table for tone mapping or other image processing functions in accordance with this disclosure.

FIG. 2 illustrates an example architecture 200 for generating a 3D lookup table for tone mapping or other image processing functions in accordance with this disclosure. For ease of explanation, the architecture 200 shown in FIG. 2 is described as being implemented on or supported by the electronic device 101 in the network configuration 100 of FIG. 1. However, the architecture 200 shown in FIG. 2 could be used with any other suitable device(s) and in any other suitable system(s), such as when the architecture 200 is implemented on or supported by the server 106.

As shown in FIG. 2, the architecture 200 receives and processes input data 202. The input data 202 here includes an input image, such as raw image data forming a raw image. The input image can be obtained in any suitable manner. For example, in some cases, the input image may be obtained using data generated by at least one imaging sensor 180 of the electronic device 101 during an image capture operation. In other cases, the input image may be obtained from a memory 130 of the electronic device 101, such as when the input image is generated or otherwise obtained previously and stored in the memory 130. In still other cases, the input image may be generated by one device (such as the electronic device 101) and provided to another device (such as the server 106, electronic device 102, or electronic device 104) for further processing. In general, this disclosure is not limited to any specific input images or techniques for generating or otherwise obtaining input images.

The input data 202 here also includes an input gain map associated with the input image. The input gain map identifies gains to be applied to pixel values of the input image during a subsequent operation. For example, the gain map may include a gain value for each pixel of the input image, where the gain value can be multiplied by the pixel value of the input image in order to adjust the pixel value of the input image. The input gain map can be generated in any suitable manner. Various techniques for generating gain maps are known in the art, and additional techniques for generating gain maps are sure to be developed in the future. In general, this disclosure is not limited to any specific input gain maps or techniques for generating input gain maps.

The input data 202 here further includes one or more input parameters. As described in more detail below, the one or more input parameters are used by the architecture 200 to control how patches are extracted from the input image and the input gain map, how certain gain values are determined for inclusion in a 3D lookup table, and how other functions of the architecture 200 can be performed. The one or more input parameters may be obtained from any suitable source(s). Depending on the implementation, at least one of the one or more input parameters may be obtained from at least one user. Also or alternatively, at least one of the one or more input parameters may be obtained from a memory 130 or other location(s), such as when the one or more input parameters were previously provided by at least one user and stored. Also or alternatively, at least one of the one or more input parameters may be determined automatically. In general, this disclosure is not limited to any specific technique for determining the one or more input parameters.

A patch extraction function 204 generally operates to extract or otherwise identify patches within the input image and the input gain map. For example, the patch extraction function 204 may identify a collection of anchor points within the input image, such as multiple anchor points arranged in a grid pattern or other pattern within the input image. The patch extraction function 204 may also extract or otherwise identify image patches within the input image, where each image patch represents a portion of the input image and is centered around one of the anchor points. The image patches may or may not overlap with one another. The patch extraction function 204 may further extract or otherwise identify gain map patches within the input gain map, where each gain map patch corresponds to one of the image patches (such as when each gain map patch includes the gain values for the pixels of the associated image patch). The gain map patches may or may not overlap with one another. In this manner, the patch extraction function 204 can produce a collection of image patches representing the input image and a collection of gain map patches representing the input gain map. One example of how the patch extraction function 204 can extract or otherwise identify patches within the input image and the input gain map is described below with respect to FIG. 3.

A statistic determination function 206 processes at least some of the patches in order to identify one or more statistical values related to the image patches or the gain map patches. For example, the statistic determination function 206 may process at least some of the patches in order to identify how gain values as defined in each gain map patch vary based on intensity values as defined in each corresponding image patch. Any suitable statistical calculation or calculations may be used here to identify the gain values that correspond to the intensity values. In some cases, for instance, gain values in a gain map patch that correspond to an intensity value i can be identified and used to compute a statistical gain value for that intensity value i, and this can be repeated for all possible intensity values or at least for all intensity values contained in the associated image patch. As a particular example, the statistical gain value for each intensity value i may be calculated as a mean, a maximum, a minimum, or a median of the gain values in the associated gain map patch for that intensity value i. The statistic determination function 206 here can produce multiple gain-intensity curves 208, where each gain-intensity curve 208 is associated with one of the image patches and its corresponding gain map patch. Each gain-intensity curve 208 defines or is otherwise associated with a curve that indicates how gain values in the associated gain map patch vary based on intensity values in the associated image patch.

The gain-intensity curves 208 are provided to a gain-intensity curve processing function 210, which modifies at least one of the gain-intensity curves 208. For example, the gain-intensity curve processing function 210 can be used to modify gain values that are associated with larger intensity values in one or more of the gain-intensity curves 208. As a particular example, for each gain-intensity curve 208, the gain-intensity curve processing function 210 can replace the gain values that are associated with intensity values larger than a threshold intensity value. Here, the gain values associated with intensity values larger than the threshold value can be replaced to create a parameterized tail that is defined using knee points. This can help to ensure that each gain-intensity curve 208 does not provide harsh changes in gain for small changes in intensity. One example of how the gain-intensity curve processing function 210 can modify gain-intensity curves 208 is described below with respect to FIGS. 4 through 6.

The gain-intensity curves 208 (as modified by the gain-intensity curve processing function 210) are filtered using one or more gain-intensity curve filtering functions 212 and 214. The filtering functions 212 and 214 here can be used to filter gain-intensity curves in different dimensions or domains. For example, the filtering function 212 can filter the gain-intensity curves along an intensity dimension or domain, and the filtering function 214 can filter the gain-intensity curves along a spatial dimension or domain. The filtering performed by the filtering function 212 along the intensity dimension or domain can help to provide smooth tone transitions for adjacent intensities. The filtering performed by the filtering function 214 along the spatial dimension or domain can help to provide smooth spatial tone transitions. Each filtering function 212 and 214 may be implemented using any suitable type of filter, such as a low-pass filter. In some embodiments, the filtering performed using the filtering functions 212 and 214 can be controlled, such as by using appropriate input parameters in the input data 202. For instance, in some cases, the filtering function 212 may be implemented using a weighted mean filter, and input parameters can include weights to be given to neighboring intensity values. Similarly, in some cases, the filtering function 214 may be implemented using a weighted mean filter, and input parameters can include weights to be given to neighboring spatial values. Overall, the gain-intensity curve processing function 210 and the gain-intensity curve filtering functions 212 and 214 can help to reduce or minimize fluctuations in intensity and spatial directions, which can help to reduce or minimize image artifacts generated in displayed or other images. The filtered gain-intensity curves produced here may represent finalized gain-intensity curves 216 associated with the input data 202.

The finalized gain-intensity curves 216 are provided to a gain-intensity curve combination function 218, which generally operates to combine the finalized gain-intensity curves 216 in order to produce a 3D gain-intensity lookup table 220. The 3D lookup table 220 can include gain values to be applied at different anchor points within the input image, and different gain values can be identified for different intensities associated with those anchor points. Thus, for example, the gain-intensity curve combination function 218 can combine the finalized gain-intensity curves 216 into a 3D data structure that identifies gain values at different anchor points for each of multiple intensities. One example of a 3D gain-intensity lookup table 220 is described below with respect to FIG. 7. The 3D lookup table 220 generated here may be used in any suitable manner. For instance, the 3D lookup table 220 may be used as a profile gain table map or other tone-mapping information embedded in or otherwise associated with a DNG file or other file containing the raw input data forming the input image. The 3D lookup table 220 may also be used to allow for automatic adjustments to the raw image data forming the input image, such as when the input image is loaded into a raw image viewer.

It should be noted that the functions shown in or described with respect to FIG. 2 can be implemented in an electronic device 101, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions. Also, the functions shown in or described with respect to FIG. 2 can be performed by a single device or by multiple devices.

Although FIG. 2 illustrates one example of an architecture 200 for generating a 3D lookup table for tone mapping or other image processing functions, various changes may be made to FIG. 2. For example, various components in FIG. 2 may be combined, further subdivided, replicated, or rearranged according to particular needs. Also, any additional pre-processing of the gain-intensity curves 208 may be performed here, and any desired post-processing of the gain-intensity curves 216 may be performed here.

Figure 3:
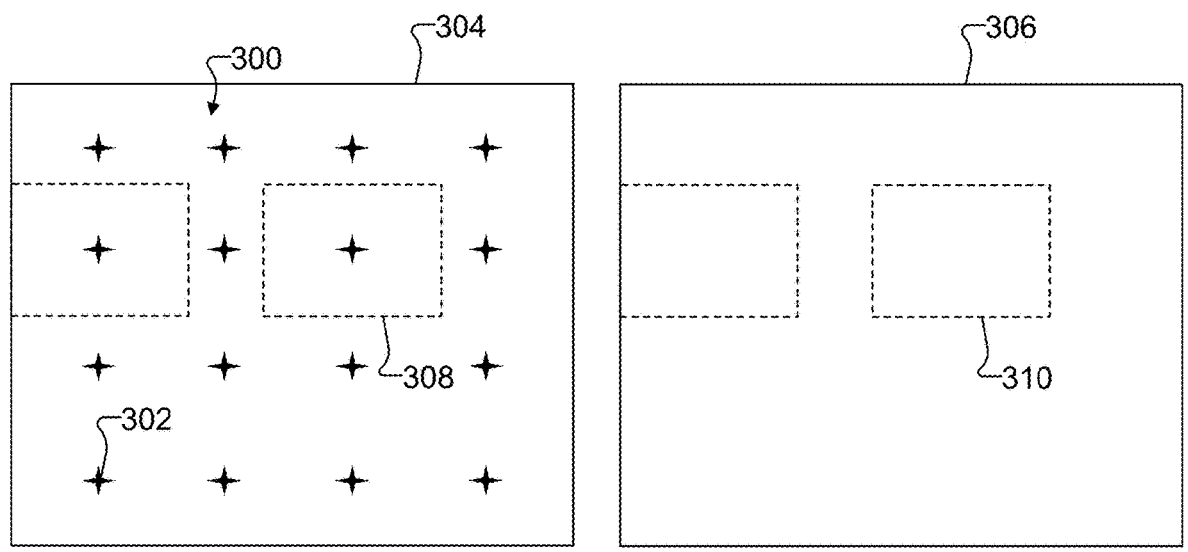
FIG. 3 illustrates an example arrangement of anchor points used by the architecture of FIG. 2 in accordance with this disclosure.

FIG. 3 illustrates an example arrangement 300 of anchor points 302 used by the architecture 200 of FIG. 2 in accordance with this disclosure. The arrangement 300 of anchor points 302 may, for example, represent the anchor points used by the patch extraction function 204 to extract image patches from an input image and to extract corresponding gain map patches from an input gain map.

As shown in FIG. 3, the arrangement 300 includes multiple anchor points 302, where each anchor point 302 represents a specific position at specific coordinates within an input image 304. The input image 304 may be included in the input data 202 received by the architecture 200. In some cases, each anchor point 302 may define a specific pixel location within the input image 304. In this example, the anchor points 302 are arranged in a grid pattern, which is defined by evenly-spaced anchor points 302 in rows and columns. However, the anchor points 302 can have any suitable arrangement within the input image 304. Note that the number of anchor points 302 can vary from the number shown here, such as when more anchor points 302 are used horizontally and vertically within the input image 304. The input image 304 is associated with a corresponding input gain map 306, which may also be included in the input data 202 received by the architecture 200. The input gain map 306 can identify gains to be applied to the pixels of the input image 304.

The patch extraction function 204 can process the input image 304 in order to extract or otherwise identify image patches 308 within the input image 304. Each image patch 308 can be centered around a corresponding one of the anchor points 302. For example, given an anchor point 302 having coordinates (v, h), the patch extraction function 204 can identify an image patch 308 centered around those coordinates (v, h). This can be performed for each of the identified anchor points 302 to produce multiple image patches 308. Depending on the implementation, adjacent image patches 308 within the input image 304 may or may not overlap with one another. While two image patches 308 are shown in FIG. 3, this is for ease of illustration only. In some embodiments, the size of the image patches 308 and whether the image patches 308 overlap can be controlled, such as by using appropriate input parameters in the input data 202.

The patch extraction function 204 can also process the input gain map 306 in order to extract or otherwise identify gain map patches 310 within the input gain map 306. Each gain map patch 310 corresponds to one of the image patches 308, such as when each gain map patch 310 matches the size of its corresponding image patch 308 and includes gain values associated with the pixel values of its corresponding image patch 308. Depending on the implementation, adjacent gain map patches 310 within the input gain map 306 may or may not overlap with one another. Again, while two gain map patches 310 are shown in FIG. 3, this is for ease of illustration only. In some embodiments, the size of the gain map patches 310 and whether the gain map patches 310 overlap can be controlled, such as by using the parameters in the input data 202 defining the image patches 308.

As described in more detail below, the image patches 308 and the gain map patches 310 are analyzed using the statistic determination function 206 in order to generate the gain-intensity curves 208. For example, the statistic determination function 206 can analyze each image patch 308 and its corresponding gain map patch 310 to determine how the gain values in the gain map patch 310 vary based on the intensity values in the image patch 308. As a particular example, the statistic determination function 206 may determine a mean, a maximum, a minimum, or a median of the gain values in the gain map patch 310 for each intensity value contained in the image patch 308 or in the input image 304.

Although FIG. 3 illustrates one example of an arrangement 300 of anchor points 302 used by the architecture 200 of FIG. 2, various changes may be made to FIG. 3. For example, the architecture 200 may support the use of anchor points 302 in any other suitable arrangement. Also, the selected arrangement may include any suitable number of anchor points 302.

Figure 4:
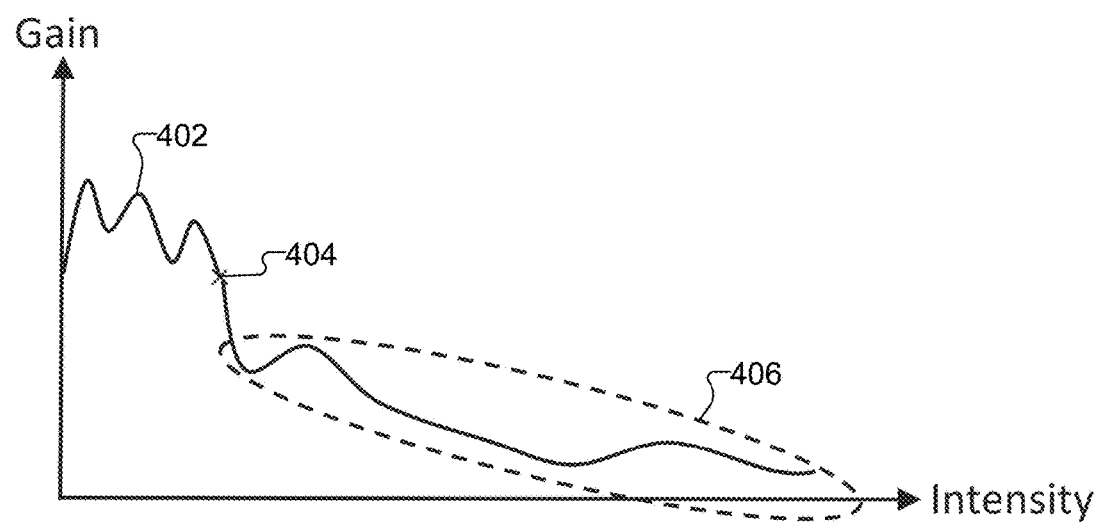
FIGS. 4 through 6 illustrate an example processing of an intensity-gain curve for an anchor point by the architecture of FIG. 2 in accordance with this disclosure.
Figure 5:
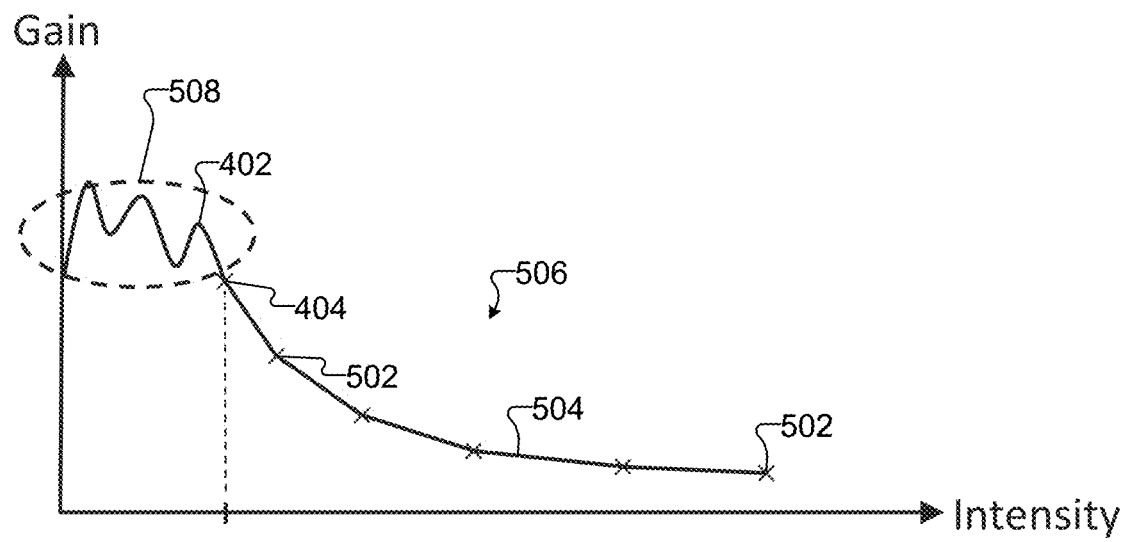
Figure 6:
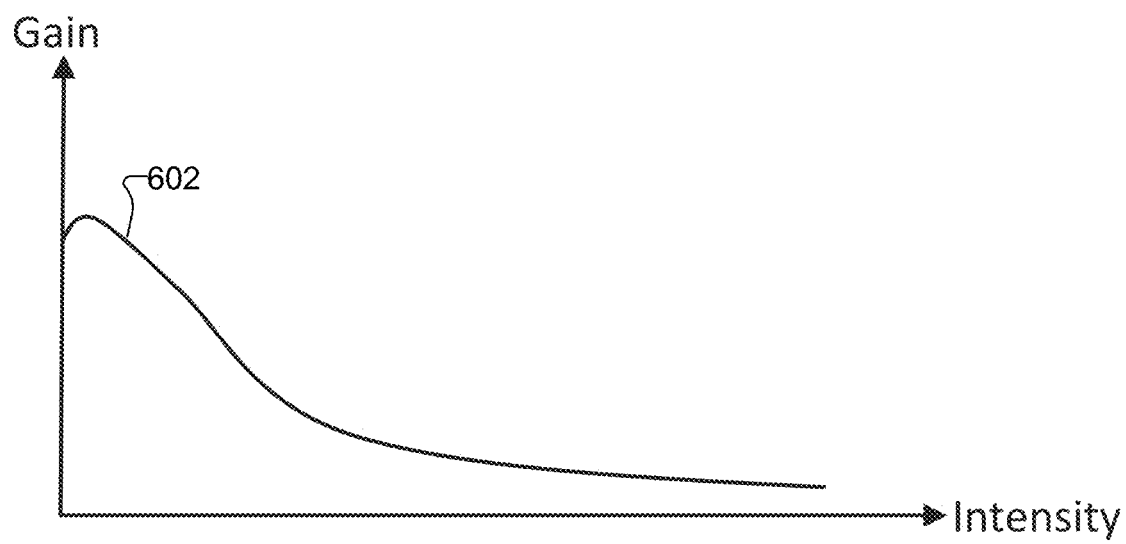

FIGS. 4 through 6 illustrate an example processing of an intensity-gain curve for an anchor point by the architecture 200 of FIG. 2 in accordance with this disclosure. The processing may, for example, represent the processing performed by the gain-intensity curve processing function 210 and the gain-intensity curve filtering functions 212 and 214.

As shown in FIG. 4, a gain-intensity curve 402 graphically illustrates how gain varies by intensity. As described above, the gain-intensity curve 402 may be produced in various ways, such as by determining the mean, maximum, minimum, or median gain values in a gain map patch 310 for different intensity values (like for all possible intensity values or for all intensity values contained in an associated image patch 308). A threshold intensity value 404 is also identified in FIG. 4. The threshold intensity value 404 represents a specified intensity value that is used to control how the gain-intensity curve 402 can be modified by the gain-intensity curve processing function 210. For example, as shown in FIG. 4, a portion 406 of the gain-intensity curve 402 represents an area where fluctuations can cause halos or other artifacts to be created in a displayed or other image. This portion 406 of the gain-intensity curve 402 is positioned above or after the threshold intensity value 404.

To help compensate for this type of issue, the portion 406 of the gain-intensity curve 402 can be replaced by a parameterized tail that is defined using multiple knee points 502 as shown in FIG. 5. The knee points 502 here are used to define a smooth decay of the gain-intensity curve 402 above the threshold intensity value 404, and different knee points 502 may be used to control how fast the gain-intensity curve 402 above the threshold intensity value 404 decays. Piece-wise line segments 504 are used in FIG. 5 to illustrate how the knee points 502 in this example may be used to define the parameterized tail of the gain-intensity curve 402, which results in the creation of a modified gain-intensity curve 506. This type of processing may be performed by the gain-intensity curve processing function 210 for each of the gain-intensity curves 208.

While this can help to reduce artifacts caused by rapid variations in the portion 406 of the gain-intensity curve 402 above the threshold intensity value 404, rapid variations in a portion 508 of the gain-intensity curve 402 or 506 below the threshold intensity value 404 can also lead to the creation of halos or other artifacts. Thus, one or more of the gain-intensity curve filtering functions 212 and 214 may be used. For instance, low-pass filtering may be used to remove the rapid variations in the portion 508 of the gain-intensity curve 402 or 506, as well as to smooth out the overall shape of the gain-intensity curve 402 or 506. This filtering can result in the creation of a finalized gain-intensity curve 602 as shown in FIG. 6. Again, this type of processing may be performed by the filtering function(s) 212, 214 for each modified gain-intensity curve 506 produced by the gain-intensity curve processing function 210. The finalized gain-intensity curves 602 for all image patches 308/gain map patches 310 can be combined in order to produce the 3D gain-intensity lookup table 220.

As can be seen here, the threshold intensity value 404 is used to control how much of each finalized gain-intensity curve 602 is based on gain values of its corresponding gain map patch 310. For intensity values below the threshold intensity value 404, each finalized gain-intensity curve 602 is based on gain values in its corresponding gain map patch 310. For intensity values above the threshold intensity value 404, the finalized gain-intensity curve 602 is based on one or more input parameters, where the one or more input parameters define the knee points 502 used to create the parameterized tail of the finalized gain-intensity curve 602. In some cases, the threshold intensity value 404 can be selected empirically, such as in order to avoid the creation of contours in tone-mapped images. In some specific circumstances (such as for a specific raw image), the threshold intensity value 404 might be set to the largest intensity value, in which case an entire finalized gain-intensity curve 602 would be based on the gain values in its corresponding gain map patch 310 (and no parameterized tail is used).

The knee points 502 that are defined here can help to ensure that the resulting finalized gain-intensity curve 602 includes a parameterized tail such that harsh changes in gain do not occur for small changes in intensity. In some cases, the knee points 502 may be determined empirically. Also, in some cases, the same knee points 502 may be used for all gain-intensity curves 402 being processed. However, the knee points 502 can be defined relative to the threshold intensity value 404, and the value of each gain-intensity curve 402 at the threshold intensity value 404 can be different for different gain-intensity curves 402. Further, an input parameter may be used to define the minimum allowed value for each finalized gain-intensity curve 602. Thus, the same set of knee points 502 can result in parameterized tails having different shapes in different finalized gain-intensity curves 602.

Although FIGS. 4 through 6 illustrate one example of processing of an intensity-gain curve for an anchor point by the architecture 200 of FIG. 2, various changes may be made to FIGS. 4 through 6. For example, the initial gain-intensity curve 402 can easily vary based on the image data being processed. Also, the number and positions of the knee points 502 can easily vary, and the resulting modified gain-intensity curve 506 can vary in any number of ways. In addition, the results of the gain-intensity curve filtering functions 212 and 214 can easily vary based on the designs of the filtering functions 212 and 214, so the resulting finalized gain-intensity curve 602 can vary in any number of ways.

Figure 7:
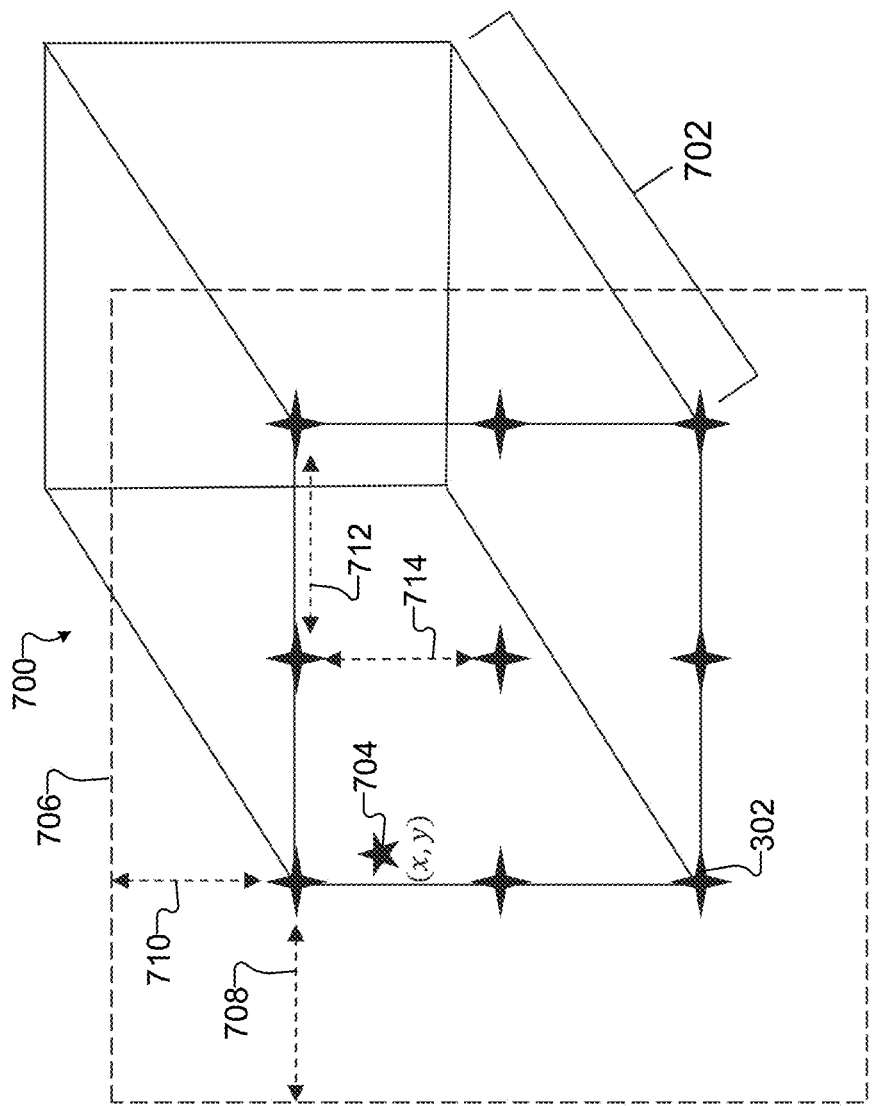
FIG. 7 illustrates an example 3D lookup table for tone mapping or other image processing functions in accordance with this disclosure.

FIG. 7 illustrates an example 3D lookup table 700 for tone mapping or other image processing functions in accordance with this disclosure. The 3D lookup table 700 may, for example, represent the 3D gain-intensity lookup table 220 generated using the architecture 200 of FIG. 2 as described above.

As shown in FIG. 7, the 3D lookup table 700 can include a gain value for each of multiple anchor points 302, which were used to identify the image patches 308 and the gain map patches 310 as described above. Moreover, the 3D lookup table 700 includes gain values for each anchor point 302 along an intensity dimension 702. This means that (i) the 3D lookup table 700 includes multiple gain values for each anchor point 302 and (ii) these gain values are associated with different intensity values. In some cases, for instance, the 3D lookup table 700 includes 256 gain values for each anchor point 302 (one gain value for each of 256 different intensity values). Note, however, that the number of gain values for each anchor point 302 along the intensity dimension 702 can vary depending on the implementation.

If tone-mapping or another image processing operation is performed using the 3D lookup table 700, arbitrary coordinates 704 within the image data may be identified. When the arbitrary coordinates 704 lie on an anchor point 302, the gain value associated with that anchor point 302 can be applied to a pixel of the image data being processed, where the specific gain value at that anchor point 302 is selected based on the intensity of that pixel. When the arbitrary coordinates 704 do not lie on an anchor point 302, the gain value to be applied to a pixel of the image data at the arbitrary coordinates 704 can be determined using the gain values at the four surrounding anchor points 302 (where those anchor points 302 are selected based on the intensity of that pixel). In some embodiments, for instance, interpolation may be used to combine the gain values at the four surrounding anchor points 302 and produce an interpolated gain value to be applied to the pixel at the arbitrary coordinates 704. Any suitable type of interpolation may be performed here, such as bilinear interpolation, although other approaches for combining gain values may also be used. The interpolations or other combinations of gain values can be repeated for all arbitrary coordinates within the image data being processed as needed in order to determine appropriate gain values to be applied to the image data.

In the example above, it has been assumed that the image data being processed is contained in a single channel. Thus, gains at arbitrary coordinates 704 within the image data can be determined as described above. However, in other cases, the image data being processed may represent multi-channel image data, such as when the input image 304 is defined using image data in a red channel, a green channel, and a blue channel (for RGB images) or image data in a red channel, a green channel, a blue channel, and a white channel (for RGBW images). In that case, it is possible for intensity values at the same pixel location to vary in the different color channels. In some embodiments, different gains from the 3D lookup table 700 could be applied to pixels in different color channels (even at the same pixel locations) based on the intensity values of those pixels in the different color channels. In other embodiments, the intensity values at a common pixel location in different channels may be combined, and the combined intensity value may be used to access the 3D lookup table 700 and identify a single gain value that is applied to that pixel location. For instance, the intensity values at the same pixel location in different color channels may be combined in the following manner.

$$Z=[R(x,y),G(x,y),B(x,y),\min(R(x,y),G(x,y),B(x,y)),\max(R(x,y),G(x,y),B(x,y))]$$

$$L=(Z \cdot \text{MapInputWeights})$$

Here, $R(x, y)$, $G(x, y)$, and $B(x, y)$ respectively represent red, green, and blue values of a pixel at the arbitrary coordinates 704 denoted $(x, y)$. Note that this listing of pixel values can change depending on which color channels are used in the image data being processed. Also, Z represents a vector formed by the pixel values and the minimum and maximum pixel values, and MapInputWeights represents a vector that weights the elements of Z. In addition, L represents the combined intensity value for the pixel values at the pixel location $(x, y)$. Once the four anchor points 302 around the pixel location $(x,y)$ are identified, the combined intensity value L can be used as the intensity for that pixel, and the four gain values at the four anchor points 302 for the combined intensity value L can be obtained from the 3D lookup table 700 and used in the same manner described above.

In the example shown in FIG. 7, the anchor points 302 are defined within a coordinate map 706. In some cases, the coordinate map 706 may correspond to the dimensions of the image data being processed (although this is not required). Also, in some cases, the anchor points 302 can be defined within the coordinate map 706 using four values, namely a horizontal distance 708 and vertical distance 710 of an anchor point 302 from an origin, a horizontal spacing 712, and a vertical spacing 714. The horizontal distance 708 defines the horizontal location or distance of one anchor point 302 from an origin (which in this example represents the upper left corner of the coordinate map 706), and the vertical distance 710 defines the vertical location or distance of that anchor point 302 from the origin. Once this anchor point 302 is identified, all other anchor points 302 may be determined using the horizontal spacing 712 and the vertical spacing 714, such as by defining the other anchor points 302 as having the horizontal spacing 712, the vertical spacing 714, or both (until no additional anchor points 302 can be defined within the coordinate map 706).

Although FIG. 7 illustrates one example of a 3D lookup table 700 for tone mapping or other image processing functions, various changes may be made to FIG. 7. For example, the 3D lookup table 700 may have gain values at any suitable number of anchor points 302 and for any suitable number of intensity values along the intensity dimension 702. Also, the anchor points 302 may be defined in any other suitable manner and arranged in any other suitable manner.

Figure 8A:
FIGS. 8A and 8B illustrate example results obtained using a 3D lookup table for tone mapping or other image processing functions in accordance with this disclosure.
Figure 8B:

FIGS. 8A and 8B illustrate example results obtained using a 3D lookup table for tone mapping or other image processing functions in accordance with this disclosure. In FIG. 8A, an image 802 of a scene is shown, including the sun in the upper right and trees and objects in the lower half. As can be seen here, the area around the sun in the image 802 is over-exposed. Also, the trees and objects, as well as areas around the trees and objects, in the image 802 are under-exposed.

In FIG. 8B, an image 804 of the same scene is shown. However, the image data for the image 804 has been processed using the architecture 200 above, and the image data is tone-mapped using the resulting 3D gain-intensity lookup table 220. As can be seen here, a much smaller area around the sun in the image 804 is over-exposed. Also, the trees and objects, as well as the areas around the trees and objects, in the image 804 are brighter and more detailed (less under-exposed). This results in a much more pleasing and accurate image 804 since it shows more natural details in various portions of the image 804.

Although FIGS. 8A and 8B illustrate one example of results obtained using a 3D lookup table for tone mapping or other image processing functions, various changes may be made to FIGS. 8A and 8B. For example, images of scenes can vary widely, and the results of the tone mapping or other image processing functions can also vary based on the circumstances and the implementation. As a result, FIGS. 8A and 8B are merely meant to illustrate one example of the type of results that could be obtained using the approaches described in this disclosure. However, FIGS. 8A and 8B do not limit the scope of this disclosure to any particular type of results.

Figure 9:
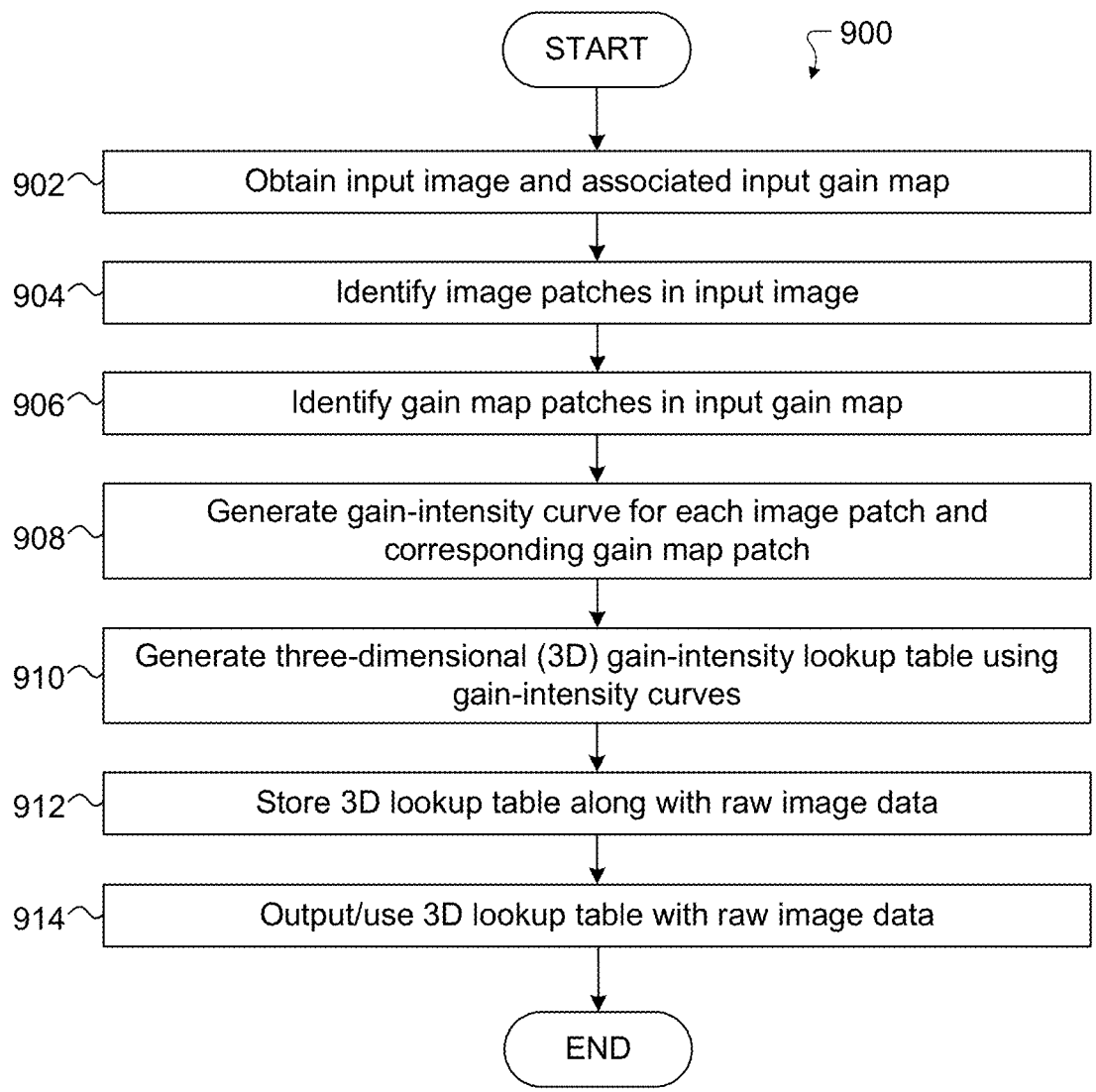
FIG. 9 illustrates an example method for generating a 3D lookup table for tone mapping or other image processing functions in accordance with this disclosure.

FIG. 9 illustrates an example method 900 for generating a 3D lookup table for tone mapping or other image processing functions in accordance with this disclosure. For ease of explanation, the method 900 shown in FIG. 9 is described as being performed by the electronic device 101 in the network configuration 100 of FIG. 1. However, the method 900 shown in FIG. 9 could be performed by any other suitable device(s) and in any other suitable system(s), such as when the method 900 is performed by the server 106.

As shown in FIG. 9, an input image and an associated input gain map are obtained at step 902. This may include, for example, the processor 120 of the electronic device 101 obtaining raw image data or other image data defining an input image 304, such as from one or more imaging sensors 180 of the electronic device 101. This may also include the processor 120 of the electronic device 101 generating or otherwise obtaining an input gain map 306 associated with the input image 304.

Image patches in the input image are extracted or otherwise identified at step 904, and gain map patches in the input gain map are extracted or otherwise identified at step 906. This may include, for example, the processor 120 of the electronic device 101 identifying anchor points 302 associated with the input image 304. This may also include the processor 120 of the electronic device 101 identifying image patches 308 in the input image 304. The image patches 308 may be centered on the anchor points 302, and the size of the image patches 308 may be defined in any suitable manner (such as via one or more input parameters). This may further include the processor 120 of the electronic device 101 identifying gain map patches 310 in the input gain map 306 that correspond to the image patches 308 in the input image 304. The image patches 308 may or may not overlap with one another, and the gain map patches 310 may or may not overlap with one another.

A gain-intensity curve is generated for each image patch and its corresponding gain map patch at step 908. This may include, for example, the processor 120 of the electronic device 101 identifying at least one statistical value (such as a mean, a maximum, a minimum, or a median) of the gain values in each gain map patch 310 for each intensity value (or at least each intensity value contained in the associated image patch 308). The statistical values of the gain values across the intensities can form gain-intensity curves 208. This may also include the processor 120 of the electronic device 101 replacing a portion of each gain-intensity curve 208 above a threshold intensity value 404 with a parameterized tail having a smooth decay. This may further include the processor 120 of the electronic device 101 filtering the modified gain-intensity curves, such as in the intensity domain, the spatial domain, or both. A 3D gain-intensity lookup table is generated using the gain-intensity curves at step 910. This may include, for example, the processor 120 of the electronic device 101 combining the filtered gain-intensity curves to produce a 3D data structure in which gain values are associated with anchor points 302 for each of multiple intensity values, thereby forming the 3D lookup table 220.

The 3D lookup table may be used in various ways depending on the implementation. For example, in some embodiments, the 3D lookup table can be stored in association with raw image data representing the input image at step 912. This may include, for example, the processor 120 of the electronic device 101 storing the 3D lookup table 220 as a profile gain table map or other tag in a DNG file or other data. This may also include outputting or using the 3D lookup table with the raw image data at step 914. This may include, for example, the processor 120 of the electronic device 101 loading the raw image data into a viewer and automatically adjusting a tone-mapping of the raw image data based on the 3D lookup table 220. Part of this process can include interpolating or otherwise combining gain values at four anchor points 302 within the 3D lookup table 220 for each pixel at arbitrary coordinates 704 within the raw image data to produce an interpolated gain value and then applying the interpolated gain value to the pixel at the arbitrary coordinates 704. Note, however, that the 3D lookup table 220 may be used in any other suitable manner.

Although FIG. 9 illustrates one example of a method 900 for generating a 3D lookup table for tone mapping or other image processing functions, various changes may be made to FIG. 9. For example, while shown as a series of steps, various steps in FIG. 9 may overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining an image and a gain map associated with the image;
identifying image patches in the image and corresponding gain map patches in the gain map, wherein different image patches are centered around different anchor points in the image;
for each image patch and its corresponding gain map patch, generating an intensity-gain curve for the associated anchor point, wherein the intensity-gain curve specifies (i) gain values based on the corresponding gain map patch for intensity values up to a threshold intensity value and (ii) gain values based on one or more input parameters for intensity values above the threshold intensity value;
for each of at least one of the intensity-gain curves, replacing a portion of the intensity-gain curve with a parameterized tail, the portion having intensity values above the threshold intensity value; and
combining the intensity-gain curves to generate a three-dimensional (3D) lookup table, the 3D lookup table identifying the gain values for the anchor points in the image at each of multiple intensity values.

2. The method of claim 1, wherein, for each intensity-gain curve, the one or more input parameters define knee points for a portion of the intensity-gain curve above the threshold intensity value, the knee points used to define the parameterized tail and smooth decay of the intensity-gain curve.

3. The method of claim 1, wherein, for each intensity-gain curve, the gain value associated with each intensity value up to the threshold intensity value comprises a mean, a maximum, a minimum, or a median of the gain values in the corresponding gain map patch.

4. The method of claim 1, wherein combining the intensity-gain curves to generate the 3D lookup table comprises:
performing low-pass filtering of the intensity-gain curves across an intensity dimension to provide smooth tone transitions between adjacent intensity values.

5. The method of claim 1, wherein combining the intensity-gain curves to generate the 3D lookup table comprises:
performing low-pass filtering of the intensity-gain curves across a spatial dimension to provide smooth spatial tone transitions.

6. The method of claim 1, further comprising:
storing the 3D lookup table in association with raw image data representing the image, wherein the 3D lookup table automatically adjusts a tone-mapping of the raw image data when the raw image data is loaded into a viewer.

7. The method of claim 6, wherein the tone-mapping of the raw image data is adjusted by:
identifying four coordinates in the 3D lookup table, the four coordinates associated with four anchor points around an arbitrary coordinate of the raw image data;
identifying gain values contained in the 3D lookup table at the four coordinates;
performing interpolation of the identified gain values to generate an interpolated gain value; and
applying the interpolated gain value to at least one pixel of the raw image data at the arbitrary coordinate.

8. An apparatus comprising:
at least one processor configured to:
obtain an image and a gain map associated with the image;
identify image patches in the image and corresponding gain map patches in the gain map, wherein different image patches are centered around different anchor points in the image;
for each image patch and its corresponding gain map patch, generate an intensity-gain curve for the associated anchor point, wherein the intensity-gain curve specifies (i) gain values based on the corresponding gain map patch for intensity values up to a threshold intensity value and (ii) gain values based on one or more input parameters for intensity values above the threshold intensity value;
for each of at least one of the intensity-gain curves, replace a portion of the intensity-gain curve with a parameterized tail, the portion having intensity values above the threshold intensity value; and
combine the intensity-gain curves to generate a three-dimensional (3D) lookup table, the 3D lookup table identifying the gain values for the anchor points in the image at each of multiple intensity values.

9. The apparatus of claim 8, wherein, for each intensity-gain curve, the one or more input parameters define knee points for a portion of the intensity-gain curve above the threshold intensity value, the at least one processor configured to use the knee points to define the parameterized tail and smooth decay of the intensity-gain curve.

10. The apparatus of claim 8, wherein, for each intensity-gain curve, the gain value associated with each intensity value up to the threshold intensity value comprises a mean, a maximum, a minimum, or a median of the gain values in the corresponding gain map patch.

11. The apparatus of claim 8, wherein, to combine the intensity-gain curves to generate the 3D lookup table, the at least one processor is configured to perform low-pass filtering of the intensity-gain curves across an intensity dimension to provide smooth tone transitions between adjacent intensity values.

12. The apparatus of claim 8, wherein, to combine the intensity-gain curves to generate the 3D lookup table, the at least one processor is configured to perform low-pass filtering of the intensity-gain curves across a spatial dimension to provide smooth spatial tone transitions.

13. The apparatus of claim 8, wherein the at least one processor is further configured to store the 3D lookup table in association with raw image data representing the image.

14. The apparatus of claim 13, wherein:
the at least one processor is further configured to adjust a tone-mapping of the raw image data when the raw image data is loaded into a viewer; and
to adjust the tone-mapping of the raw image data, the at least one processor is configured to:
identify four coordinates in the 3D lookup table, the four coordinates associated with four anchor points around an arbitrary coordinate of the raw image data;
identify gain values contained in the 3D lookup table at the four coordinates;
perform interpolation of the identified gain values to generate an interpolated gain value; and
apply the interpolated gain value to at least one pixel of the raw image data at the arbitrary coordinate.

15. A non-transitory computer readable medium containing instructions that when executed cause at least one processor to:
obtain an image and a gain map associated with the image;
identify image patches in the image and corresponding gain map patches in the gain map, wherein different image patches are centered around different anchor points in the image;
for each image patch and its corresponding gain map patch, generate an intensity-gain curve for the associated anchor point, wherein the intensity-gain curve specifies (i) gain values based on the corresponding gain map patch for intensity values up to a threshold intensity value and (ii) gain values based on one or more input parameters for intensity values above the threshold intensity value;
for each of at least one of the intensity-gain curves, replace a portion of the intensity-gain curve with a parameterized tail, the portion having intensity values above the threshold intensity value; and
combine the intensity-gain curves to generate a three-dimensional (3D) lookup table, the 3D lookup table identifying the gain values for the anchor points in the image at each of multiple intensity values.

16. The non-transitory computer readable medium of claim 15, wherein, for each intensity-gain curve, the one or more input parameters define knee points for a portion of the intensity-gain curve above the threshold intensity value, the instructions when executed causing the at least one processor to use the knee points to define the parameterized tail and smooth decay of the intensity-gain curve.

17. The non-transitory computer readable medium of claim 15, wherein, for each intensity-gain curve, the gain value associated with each intensity value up to the threshold intensity value comprises a mean, a maximum, a minimum, or a median of the gain values in the corresponding gain map patch.

18. The non-transitory computer readable medium of claim 15, wherein the instructions that when executed cause the at least one processor to combine the intensity-gain curves to generate the 3D lookup table comprise at least one of:
instructions that when executed cause the at least one processor to perform low-pass filtering of the intensity-gain curves across an intensity dimension to provide smooth tone transitions between adjacent intensity values; and
instructions that when executed cause the at least one processor to low-pass filtering of the intensity-gain curves across a spatial dimension to provide smooth spatial tone transitions.

19. The non-transitory computer readable medium of claim 15, further containing instructions that when executed cause the at least one processor to store the 3D lookup table in association with raw image data representing the image.

20. The non-transitory computer readable medium of claim 19, further containing instructions that when executed cause the at least one processor to adjust a tone-mapping of the raw image data when the raw image data is loaded into a viewer;
wherein the instructions that when executed cause the at least one processor to adjust the tone-mapping of the raw image data comprise instructions that when executed cause the at least one processor to:
identify four coordinates in the 3D lookup table, the four coordinates associated with four anchor points around an arbitrary coordinate of the raw image data;
identify gain values contained in the 3D lookup table at the four coordinates;

perform interpolation of the identified gain values to generate an interpolated gain value; and apply the interpolated gain value to at least one pixel of the raw image data at the arbitrary coordinate.

21. The method of claim 1, wherein the parameterized tail is defined using knee points to control how fast the intensity-gain curve above the threshold intensity value decays.

\* \* \* \* \*